3,170,795
CULINARY MIX FOR PRODUCING CHEMICALLY LEAVENED BAKED GOODS
Arlee A. Andre, Springfield Township, Hamilton County, Ohio, assignor to The Procter & Gamble Company, Cincinnati, Ohio, a corporation of Ohio
No Drawing. Filed Mar. 9, 1962, Ser. No. 178,538
4 Claims. (Cl. 99—94)

This invention relates to baked products and to pulverulent culinary mixes useful in the production of the same. More particularly, this invention relates to culinary mixes of the chemically leavened type which can be composed into baked products having the essential properties of comparable yeast-leavened products.

There has been an increasing demand among consumers for "instant dry mixes" which are packaged for distribution and sale through retail outlets to the homemaker, who with a few simple steps can produce a freshly baked product in the home. Usually the homemaker has merely to add a specified amount of water to the contents of the package, mix thoroughly to form the plastic dough, and bake the dough in a container according to instructions. The goal of all such mixes is the creation of products equal or superior to first-class "homemade" baked goods in which the preparation of the dough directly from its several ingredients as well as the actual baking is accomplished in the home.

Traditionally, a certain class of baked goods, such as bread, rolls, coffee cake, cinnamon rolls, and other breadtype products, is leavened by the fermentation of yeast. Yeast is an entirely satisfactory leavening agent where the dough is prepared and baked in a more or less continuous sequence of operations, such as is done at a commercial bakery or in the home, which typically involves mixing the dry ingredients with the aqueous fluid to form a sticky dough, allowing the dough to rise under warm conditions, kneading the risen dough, allowing the kneaded dough to rise again, re-kneading, shaping into the desired product, proofing, and baking. In the case of instant dry mixes, however, wherein dough preparation and baking are necessarily separated from the commingling of the non-aqueous ingredients by a substantial period of time, certain disadvantages become apparent if yeast is employed as leavening. In the first place, yeast has a tendency to react prematurely with other ingredients of the mix even if the moisture content be maintained as low as is conveniently possible. Secondly, yeast itself is extremely difficult to store for long periods of time because of its instability. Various additives have been discovered which tend to stabilize yeast, thus prolonging its usefulness, but none has proved entirely satisfactory.

It has, of course, long been known to employ chemical leavening systems in making another class of baked goods, such as biscuits, cobblers, shortbreads, and other products characterized by so-called "shortness" resulting from the use of relatively large amounts of shortening. The classic example of a chemical system is the familiar "baking powder," which is a combination of a carbon dioxide-liberating compound, usually sodium or potassium bicarbonate, a baking acid or acid salt, such as tartaric acid, sodium acid phosphate, sodium acid sulfate, monocalcium phosphate, or the like, to react with the carbon dioxide-liberating compound in the presence of moisture and release gaseous $CO_2$, and usually in inert diluent. Considerable strides have recently been made in developing improved combinations of compounds as chemical leavening systems. A notable example of such an improved combination is glucono-delta-lactone and a baking soda, characterized by a relatively slow rate of $CO_2$ release, as is described in U.S.P. 2,478,618 and in numerous articles in journals in the baking field.

These improved combinations have been employed quite successfully in culinary mixes for the class of products normally leavened by chemical agents and, quite naturally, such success stimulated workers in the field to explore the possibility of replacing the yeast in products normally leavened by yeast with these combinations in an attempt to obtain a mix having good storage qualities that nevertheless produced baked goods comparable in properties to the yeast-leavened goods.

This goal, however, has proved difficult of attainment due mainly to the peculiar combination of properties found in yeast-leavened goods. These properties include high volume and porous grain by virtue of controlled release of $CO_2$ in yeast fermentation, a stretchy, chewy quality by virtue of adequate development of the gluten of the flour protein during kneading and rising, and a slightly sour, fermented, yeasty taste. By their very nature, chemical leavening agents are poorly suited to provide these properties as has been borne out by the inferior quality of bread-type goods so leavened.

The results of a recent attempt by the Quartermaster Corps of the Army to solve the problem are summarized in U.S.P. 2,969,289. Here, glucono-delta-lactone was employed as the baking acid in a bread-type mix, no doubt in the hope that the action of this compound would more closely duplicatae that of yeast, and a special flavor preparation derived from yeast was added to simulate a natural yeasty flavor. While the quality of the ultimate product was apparently somewhat better than is true with other chemical leavening agents, extensive experimentation has proved conclusively that the concept of this patent is by no means the complete answer but that the problem of finding a chemical substitute for yeast as leavening is closely interrelated with the formulation of the mix, conventional formulations being inherently inclined to result in heavy, dense, tough bread products.

It is an object of this invention to produce an instant culinary mix containing a chemical leavening agent which when made into dough and baked will result in products having essentially the same grain texture, crumb appearance, and eating charactertistics of corresponding yeast-raised baked goods.

It has been discovered that a unique coaction exists between the protein content of the flour of the mix formulation and the leavening capabilities of a chemical system comprising glucono-delta-lactone and a baking soda, whereby a bread-type product leavened with this system duplicating in essential properties a comparable yeast-leavened product can be obtained, provided the flour employed in the mix formulation has a protein content of at least about 18%, preferably between 18% and 25%, by weight of the flour as measured by the standard Kjeldahl method. In a broad sense, the invention may be understood as involving the combination of a standard mix formulation for making bread, cinnamon rolls, coffee cake, and similar bread-type goods, except that the flour has a protein content of at least 18% in contrast to the normal content of 8–11%, and a leavening system comprising a mixture of glucono-delta-lactone and a baking soda.

Flour having the protein content necessary for purposes of the invention is available from commercial sources at the present time. One suitable material is a flour containing 18–22% protein obtained by impact grinding and sold under the trade-name "Orbit." A flour of this type may be produced from a soft winter wheat flour or a hard wheat flour substantially free from bran and germ according to a process described in U.S. Patent 2,957,632 to Sullivan et al. The present invention is not limited, however, to the use of flour produced by process of the above-identified patent since other flours of the requisite protein content can be obtained by air-classification techniques and can be employed with satisfactory results. Where the term "high-protein flour" appears herein, it will be understood to mean a wheat flour containing at least about 18% by weight protein.

The leavening system, as stated earlier, may comprise a mixture of glucono-delta-lactone and a gas-producing chemical, the ratio of the gas-producing chemical to the glucono-delta-lactone being from about 1.5:1 to about 0.5:1 on an equivalent weight basis, with a 1:1 ratio being preferred. As used herein, an equivalent weight is the molecular weight of the compound divided by its valence change, i.e. its combining power, in the neutralization reaction of the leavening system.

In order to achieve satisfactory leavening for most products of the type with which the invention is concerned, it has been found advisable to provide from about 2.5% to about 7.5% of the glucono-delta-lactone by weight of the dry ingredients in the mix. At levels much below about 2.5%, too little glucono-delta-lactone is present to cause the product to rise to the extent desired by most consumers. On the other hand, if appreciably more than about 7.5% is employed, the product tends to become excessively porous and coarse as is characteristic of overly leavened goods.

Glucono-delta-lactone is, by nature, a relatively slow-acting acidic leavening substance, requiring exposure to heat for its effect to be exerted. As a result, where glucono-delta-lactone is the sole acidic leavening substance, little, if any, carbon dioxide is released in the dough until the start of baking, causing the dough to be rather flat or lifeless and lacking the easy handling qualities desirable for purposes of shaping and the like. This objection may be, and preferably is, overcome by the addition of one or more of the fast-acting acidic leavening substances conventionally employed in chemical leavening systems in sufficient quantity to give life and resilience to the dough while being shaped in advance of baking. An amount of the fast-acting agent up to about one-third of the range of glucono-delta-lactone specified above, i.e., up to about 2.5% by weight of the dry ingredients of the mix, will suffice for the products of this invention in general. As employed herein, the term "fast-acting acidic leavening agent" or equivalent will be understood as connoting a baking acid or salt adapted to react with the basic carbon dioxide-liberating substance in the presence of water at approximately room temperature or at least well below baking temperature. Examples of this class are monocalcium phosphate, monosodium phosphate, monopotassium phosphate, disodium phosphate, dipotassium phosphate, sodium acid sulfate, and potassium acid tartrate, among others. In addition, certain other acidic baking salts, e.g., dicalcium phosphate, sodium acid pyrophosphate, sodium aluminum phosphate and sodium aluminum sulfate, are known to be somewhat slower acting than the others enumerated above, although they are fast-acting compared to glucono-delta-lactone and are so classified for present purposes. Compounds of the latter type can be employed as the additional acidic leavening substance of the invention under circumstances where release of $CO_2$ in part during mixing and handling and in part during baking is advantageous.

Any of the usual basic gas-producing chemical leavening substances can be selected, including sodium bicarbonate, potassium bicarbonate and, in some special instances, ammonium bicarbonate. At the present time, glucono-delta-lactone is the only known acidic leavening compound suitable for use in association with high-protein flour as defined herein to achieve the objectives of the invention. If there should be developed in the future compounds of comparable properties, their substitution for glucono-delta-lactone would be a logical adaptation of the present concept.

As already indicated, a great variety of bread-like products may be produced using the novel combination of the present chemical leavening system and high-protein flour. The generic composition of the mix from which the bread-like products may be produced is as follows, all percentages here and elsewhere being by weight of the ingredients in a condition of normal dryness, i.e., as supplied commercially:

GENERIC FORMULATION OF MIX

| | Percent by weight of complete mix |
|---|---|
| Basic mix: | |
| Flour (containing at least 18% protein) | 55.0–80.0 |
| Sugar | 5.0–20.0 |
| Shortening | 2.0–10.0 |
| Non-fat dry milk solids | 2.0–6.0 |
| Salt | 1.0–3.0 |
| Flavoring | 0–1.0 |
| Leavening system: | |
| Glucono-delta-lactone | 2.5–7.5 |
| Fast-acting acidic leavening agent | 0–2.5 |
| Gas-producing leavening agent sufficient for ratio of 1.5:1–0.5:1 on equivalent weight basis of total of acidic agents. | |

The choice and grade of ingredients in the complete mix exclusive of the flour are not critically related to the invention and may follow standard practice in the art. A small amount of the high-protein flour may be replaced by specialty flours, e.g., potato flour, rice flour, rye flour, whole wheat flour, as needed for particular products. Granulated sugar is satisfactory in many instances but other sugars, such as dextrose, fructose, lactose, maltose, and invert sugar, can be substituted in whole or in part. Any of the commercially available shortenings derived from animal fat or vegetable oils will give acceptable products. At the present time, these are often hydrogenated and may include a minor proportion of one or more emulsifying agents. A wide variety of such agents has been suggested for association with shortening and the selection from among these is within the skill of the art. Partial fatty acid esters of polyhydric alcohols, such as the lower glycols, glycerol, sorbitol, and the like, are often of exceptional value. The consistency of the shortening or emulsified shortening can range from distinctly plastic to quite fluids as may be best under given circumstances. For the preparation of sweet goods, various toppings containing nuts, fruit in the form of pieces, chips, or bits, coconut flakes or shreds, chocolate chips, etc., can be provided.

The procedure utilized in compounding the several ingredients into the prepared dry mix may be taken from the technology that has been developed in the field. It is frequently most convenient to prepare a homogenous blend of the dry constituents and then disperse the shortening therein in the form of either a plastic solid or a fluid. If the shortening is not normally fluid, it may be melted. Addition of the leavening agents late in the mixing cycle is advisable if a fast-acting acidic agent is present to preclude as much as possible any premature reaction. Mixing may be carried out in commercial equipment, such as a ribbon blender or paddle mixer, and may be adapted for continuous as well as batch operation. If the product tends to be excessively lumpy, passage through an impact grinder, such as a hammer mill or Entoleter will result in a more uniform product. The completed prepared mix is packaged and distributed through commercial channels. Packages of the type preventing free access of air to their contents are advisable but hermetically sealed containers are not required, an ordinary paperboard carton and sealed wrapper being entirely adequate for this purpose.

In producing a baked product according to this invention, water and egg material, i.e., egg solids or whole egg, where required and not included in the mix, are mixed into the prepared dry mix and the resultant plastic dough is shaped into the culinary article that it is designed to produce and is placed in the oven. The amount of water used is determined according to established usage in bread-type products, less water being needed for high sugar mixes and more for low sugar mixes. Typically, an oven temperature of around 400° F. is used for bread, and lower temperatures for sweet doughs. Any desired topping can be applied to the dough in accordance with the product ultimately desired.

In order to best illustrate the novel features and advantages of the invention, the following examples are included to convey a more complete understanding of the details of the invention, especially with respect to the formulation of specific goods, as well as the benefits and advantages afforded thereby.

Example I

Four portions of a basic dry bread mix, labeled G, H, I, and J, were prepared of the following composition:

| Basic mix: | Parts (by weight) |
|---|---|
| Flour [1] | 73.9 |
| Dextrose | 7.6 |
| Shortening [2] | 6.0 |
| Non-fat milk solids | 2.5 |
| Salt | 1.6 |
| Flavor | 0.4 |

[1] The flour was of the high-protein type having a protein content between 18 and 22%, or an average of 20%, and sold under the trade-name "Orbit."
[2] The shortening was a plastic mixture composed of 50% fatty acid triglyceride hydrogenated to an iodine value of about 60 and 50% fatty acid triglyceride hydrogenated to an iodine value of about 78 and super-glycerinated to form a mixture of about 40% mono-, 40% di-, and 20% triglyceride.

A leavening system consisting of varying amounts of glucono-delta-lactone and sodium bicarbonate was added to the above portions as follows, the percentages being by weight of the complete dry mix:

G—3.2% glucono-delta-lactone and 1.5% soda
H—5.3% glucono-delta-lactone and 2.5% soda
I—6.4% glucono-delta-lactone and 3.0% soda
J—7.4% glucono-delta-lactone and 3.5% soda The mixes were prepared by creaming the sugar and shortening in a heavy duty food mixer, such as that sold under the trade-name "Hobart," and then adding the remaining ingredients and mixing until dry mixes were formed.

The bread was prepared in the following manner: One egg and ½ cup water were stirred together and 135 gm. of the bread mix was added and beaten for about a minute. Another 135 gm. of the bread mix was added and mixed by stirring and cutting for about one minute until the dry ingredients were thoroughly moistened. The resultant dough was rolled out on a floured board, shaped, and placed in a bread pan and baked for about 15 minutes at 400° F., after which the bread was turned out to cool.

Examination of the four loaves of bread produced with varying concentrations of the chemical system revealed that there was a corresponding variation in the volume of the loaves of bread. Loaves produced from the H, I, and J mixes were respectively about 12, 25, and 30% higher than bread produced from the G mix. Not only was there a progressive increase in volume with increasing amounts of the leavening system, but there was a corresponding decrease in the density of the bread. In every case, regardless of the amount of leavening system used, the cellular structure was fine and evenly developed, giving good texture and eating characteristics.

Example II

Three portions of bread mixes, labeled A, B, and C, having the following compositions were prepared:

| Basic mix | Parts by weight |
|---|---|
| Flour [1] | 73.9 |
| Dextrose | 7.6 |
| Shortening [2] | 6.0 |
| Non-fat milk solids | 2.5 |
| Salt | 1.6 |
| Flavor | 0.4 |

| Leavening system: | Percent by weight of complete mix |
|---|---|
| Glucono-delta-lactone | 7.4 |
| Sodium bicarbonate | 3.5 |

[1] The type of flour used in each portion is as follows:
A—All-purpose bread flour containing 12% protein.
B—Special bread flour containing 15% protein.
C—Air-separated flour containing 18–22% protein.
[2] Same as in Example I.

The process of preparing the mix and bread was the same as that described in Example I.

The loaves produced from the A and B mixes, containing 12 and 15% protein, respectively, were about equal in volume. On being sliced the bread was found to be coarse and dense and had an irregular grain. In distinct contrast, the loaf produced from the mix containing the high-protein flour was about 50% higher than the A and B loaves. This marked increase in the volume of loaf C, prepared in accordance with the invention, shows the critical interaction of the high-protein flour, as defined herein, with the specified chemical leavening system as is necessary for a satisfactory product.

The following example is intended to demonstrate the advantages derived from the use of the novel combination of the particular chemical leavening system and high-protein flour of the invention as contrasted with the use of yeast as leavening for the same high-protein flour.

Example III

Two portions of bread mixes, labeled E and F, each having the following compositions, were prepared:

| Basic mix: | Parts (by weight) |
|---|---|
| Flour [1] | 73.9 |
| Dextrose | 7.6 |
| Shortening [2] | 6.0 |
| Non-fat milk solids | 2.5 |
| Salt | 1.6 |
| Flavor | 0.4 |

| | Percent of complete mix |
|---|---|
| Leavening system: Yeast, commercial dry | 7.0 |

[1] Same as in Example I.
[2] Same as in Example I.

The process of mixing and baking the bread as described in Example I was repeated, except that the yeast was stirred with the egg-water mixture prior to addition of the dry mix.

The dough marked "F" was not kneaded or set aside for the long raising period normally required for yeast-leavened doughs, whereas the dough marked "E" was set aside undisturbed until risen to twice its original size, and then kneaded on the floured board in the manner customary with yeast-raised doughs before being placed in the bread pan and baked.

Both the loaves produced using the yeast leavening system were unsatisfactory. The bread in both instances was heavy, with irregular, large pores. Some improvement in volume and pore distribution was observed in the loaf produced from the dough which was kneaded and allowed to rise, but even this was not a commercially desirable product.

These two examples indicate that the quality of bread leavened with yeast cannot be improved by using high-protein flour but is, in fact, impaired. Only when the present chemical leavening system is substituted for the yeast will the product be of acceptable quality. Furthermore, considerably more time (several hours) is consumed in making yeast-raised bread because of the raising and kneading steps.

To illustrate the application of the concept of the invention to sweet goods, the following are specific formulations for two such products:

SWEET ROLLS

Basic mix: Percent by weight of complete mix

| | |
|---|---|
| High-protein flour | 70.90 |
| Potato flour | 2.00 |
| Granular sugar | 10.00 |
| Shortening | 5.50 |
| Milk solids | 2.90 |
| Salt | 1.30 |
| Flavors | 0.10 |

Leavening system:

| | |
|---|---|
| Glucono-delta-lactone | 3.70 |
| Sodium bicarbonate | 2.20 |
| Dicalcium phosphate | 1.40 |

COFFEE CAKE

Basic mix:

| | |
|---|---|
| Flour | 61.49 |
| Granular sugar | 18.00 |
| Shortening | 8.50 |
| Milk solids | 2.90 |
| Salt | 1.30 |
| Flavor | 0.51 |

Leavening system:

| | |
|---|---|
| Glucono-delta-lactone | 3.70 |
| Sodium bicarbonate | 2.20 |
| Dicalcium phosphate | 1.40 |

Doughs prepared from these mixes produce entirely satisfactory products when twisted, wound, or otherwise shaped to the desired configuration, provided with a typical confectionary filling or topping, and baked in a moderate oven, i.e., 350° F.

An outstanding and unpredictable difference attributable to the novel combination of the invention is readily apparent after a comparison of the examples and figures described above. The grain and texture of the bread produced from mixes incorporating the glucono-delta-lactone-containing leavening system and high-protein flour are far superior to those of bread from similar mixes containing flour having lower percentages of protein or from yeast-raised doughs made from high-protein flour and are much more comparable to conventional yeast-leavened breads. The same is true as to volume and eating quality.

I claim:

1. A pulverulent culinary mix for the quick preparation of baked bread-type products without conventional proofing and gluten development steps, said products having substantially the characteristics of baked goods leavened by means of yeast, said mix comprising
    (A) high protein air-classified wheat flour having a protein content of between about 18% and 25% by weight of the flour;
    (B) shortening;
    (C) about 2.5–7.5% by weight of the mix of glucono-delta-lactone;
    (D) from 0% to about 2.5% by weight of the mix of at least one fast-acting acidic leavening agent; and
    (E) an amount of a basic $CO_2$-producing chemical leaving substance sufficient to maintain a ratio of 1.5:1 to 0.5:1 with respect to the total of said lactone and fast-acting acidic leavening substance on an equivalent weight basis.

2. The culinary mix of claim 1 in which the basic $CO_2$-producing chemical substance is sodium bicarbonate.

3. A pulverulent culinary mix for the quick preparation of baked bread-type products without conventional proofing and gluten development steps, said products having substantially the characteristics of baked goods leavened by means of yeast, said mix comprising by weight:
    (A) 55.0–80.0% high protein air-classified wheat flour having a protein content of between about 18% and 25% by weight of the flour;
    (B) 5.0–20.0% sugar;
    (C) 2.0–10.0% shortening;
    (D) 2.0–6.0% nonfat dry milk soilds;
    (E) 1.0–3.0% salt;
    (F) 2.5–7.5% glucono-delta-lactone;
    (G) 0–2.0% dicalcium phosphate;
    (H) 0–0.5% monocalcium phosphate; and
    (I) an amount of a basic $CO_2$-producing chemical leavening substance sufficient to maintain a ratio of 1.5:1 to 0.5:1 with respect to the total of said lactone and said phosphate on an equivalent weight basis.

4. The culinary mix of claim 3 in which the basic $CO_2$-producing chemical leavening substance is sodium bicarbonate.

References Cited in the file of this patent

UNITED STATES PATENTS 2,969,289     Matz et al.     Jan. 24, 1961

OTHER REFERENCES

"American Miller and Processor," August 1958, p. 15.
"Cereal Science Today," April 1959, pp. 96, 98, 99.
"The Bakers Digest," October 1959, pp. 46 to 49.